No. 741,471. PATENTED OCT. 13, 1903.
A. C. EASTWOOD.
POWER TRANSLATING SYSTEM.
APPLICATION FILED APR. 3, 1903.
NO MODEL.
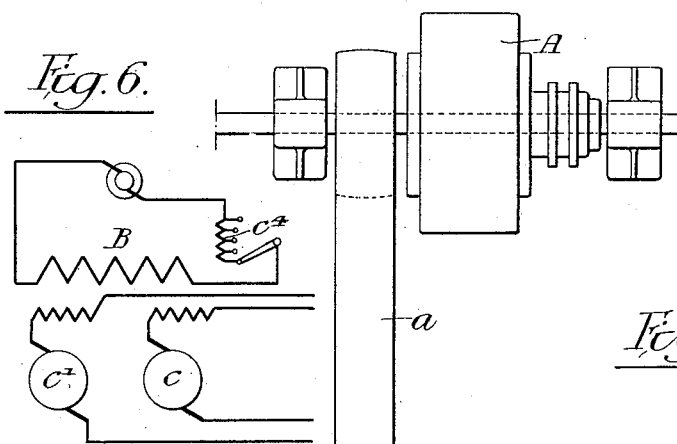
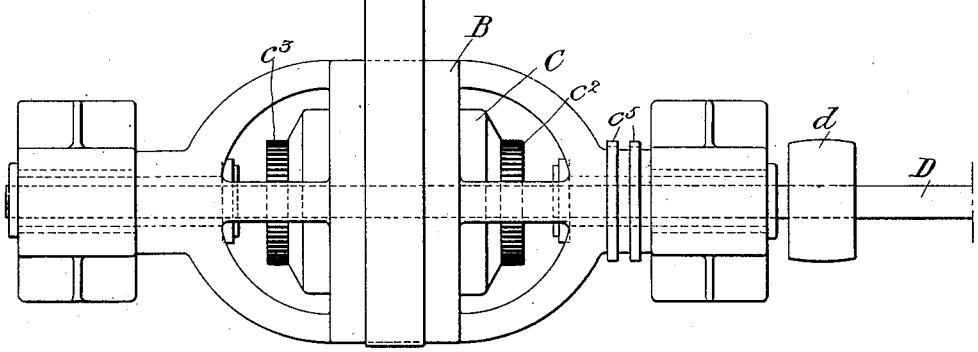
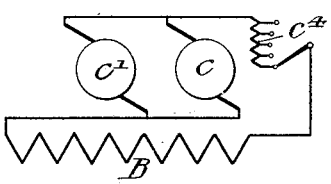
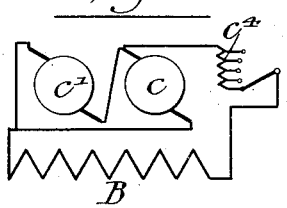
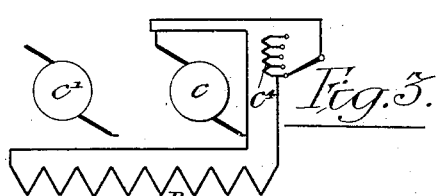
Witnesses:
Augustus B. Coppes
Herman E. Metius
Inventor:
Arthur C. Eastwood,
by his Attorneys;
Howson & Howson No. 741,471. Patented October 13, 1903.

UNITED STATES PATENT OFFICE.

ARTHUR C. EASTWOOD, OF CLEVELAND, OHIO.

POWER-TRANSLATING SYSTEM.

SPECIFICATION forming part of Letters Patent No. 741,471, dated October 13, 1903.

Application filed April 3, 1903. Serial No. 150,969. (No model.)

*To all whom it may concern:*

Be it known that I, ARTHUR C. EASTWOOD, a citizen of the United States, and a resident of Cleveland, Ohio, have invented certain Improvements in Power-Translating Systems, of which the following is a specification.

My invention consists in certain improvements in methods for controlling the operation of mechanism or devices actuated from a driver or prime mover which itself is operated continuously at a constant speed.

The object of the invention is to provide a method whereby power may be efficiently transmitted from a driving element or source of power operating at a substantially constant speed to a power-receiving device through a device intermediate of said two members by which the speed of the driven member may be varied within any desired limits. This object I attain as hereinafter set forth, reference being had to the accompanying drawings, in which—

Figure 1 is a plan view showing in diagram one arrangement of apparatus for carrying out my invention. Figs. 2 to 5, inclusive, are diagrammatic views illustrating some of the possible connections of the parts of the electric device interposed between the driving and the driven members of the system to vary the speed of said driven member, and Fig. 6 is a diagrammatic view showing another arrangement of connections for controlling the action of the electric machine and consequently the speed of the load driven.

In the above drawings, A represents any desired form of driver, such as a synchronous motor or any other desired form of motor designed to operate at a constant speed. It will be understood that for said motor may be substituted an internal-combustion or other engine, the object being that the driver operating at a constant speed shall turn one element, as B, of an electric machine. The said electrical machine is so made that both of its elements are free to rotate, and in the present instance I have shown the field-frame operatively connected, by means of a belt $a$, to the motor A.

The armature C of the electric machine is in the present instance supported upon a shaft D, having a wheel or gear $d$, through which power is transmitted to any form of power-receiving apparatus.

The armature C is constructed with two commutators $c^2$ and $c^3$ and two independent series of windings $c$ and $c'$, each connected to one of said commutators, and I preferably so design said armatures that they have different numbers of turns—as, for example, the armature-winding $c$ has one hundred active conductors, while the winding $c'$ has one hundred and fifty conductors. The field-winding carried on the frame B is preferably connected in shunt to the terminals of the brushes (not shown) belonging to the commutator of one of the sets of armature-conductors, and I preferably insert a variable resistance $c^4$ in circuit with said field-coil, so as to be able to alter the strength of the field of the electric machine at will, the current for said field-windings being supplied through rings $c^5$ of the well-known construction.

It will be understood that the field-winding is not necessarily supplied with current from one of the armature-windings $c$ or $c'$, as in practice it could be fed from a storage battery or from the exciter used in connection with the alternating-current motor. If desired, one portion of the field may be energized by current from a source external to the machine, while other portions may be connected, respectively, in series with the terminals of the two armature-windings, as shown in Fig. 6.

By means of any suitable form of controller connected in circuit with the two sets of armature-terminals I am enabled to change at will the number of effective turns on the armature considered as a whole. For example, if, as in Fig. 2, I connect the winding $c$ so that its conductors act in opposition to those of the winding $c'$ there will be fifty effective turns in operation, while, as in Fig. 3, if the terminals of the winding $c$ are short-circuited, while those of the winding $c'$ are open-circuited, there will be one hundred effective turns in action. Similarly if the terminals of the winding $c'$ be connected to each other and those of the winding $c$ be left open there will be one hundred and fifty turns in action on the armature, and if both sets of the terminals be connected so that they act in series with each other there will be two hundred and fifty conductors in action.

In operation the prime mover A is permitted to run continuously, turning the element B of the electric machine at a constant speed, and granting that there is a load connected to the shaft D through the wheel $d$ then electrically connecting the two sets of terminals of the windings $c$ and $c'$, as shown in Fig. 2, will result in fifty turns or conductors becoming effective on the armature, which will be then started and pulled around after the rotating element B, though at a speed less than the speed of rotation of said element, by an amount known as the "slip." This slip, and hence the speed of the armature C, may be varied by different combinations of the two windings $c$ and $c'$, as set forth above and as indicated in Figs. 2 to 5, or, if desired, there may be inserted in the field-circuit varying amounts of the resistance $c^4$, by which the strength of the field can be varied, thus further altering the amount of slip between the elements C and B. It will be understood that these two methods of varying the slip, and consequently the relative speed of the two elements of the electric machine, may be and preferably are to be used together, the comparatively large changes of speed being secured by the change in the number of effective armature-conductors and the smaller changes being secured by varying the field strength, though these characteristics may be altered or varied separately without departing from my invention.

Since the total current for the field-winding will not under ordinary working conditions with efficient design exceed two per cent. of the capacity of the machine, it will be seen that the insertion of the resistance $c^4$ will not materially affect the efficiency of the system.

By the above-described device I am enabled to operate the driving-motor at a constant speed and by means of the electric connecting device comprised by the two elements B and C to vary the speed of the driven member of the system within any practicable limits, which may be determined by and depend upon the electrical characteristics of the device.

I claim as my invention—

1. The method of transmitting power from a driving to a driven member, the same consisting in interposing between the two members an electric machine having its elements movably connected respectively to said members, operating the driving member at a substantially constant speed and varying the speed of the driven member by altering the electrical characteristics of the two elements of the electrical machine, substantially as described.

2. The method of transmitting power from a driving to a driven member, the same consisting in operating one element of an electric machine from said driving member at a constant speed, operating the driven member from a second element of the electric machine, supplying current from an external source to one of the elements of said electric machine and changing the relative velocities of the two members by varying the number of effective turns on the other element of the electric machine substantially as described.

3. The method of transmitting power from a driving to a driven member, the same consisting in operating one element of an electric machine from said driving member at a constant speed, operating the driven member from the second element of the electric machine, exciting the field of the electric machine and changing the relative velocities of the two members by varying the number of effective turns on the armature of said electric machine, substantially as described.

4. The method of transmitting power from a driving to a driven member, the same consisting in interposing between them an electric machine having its elements movably connected respectively to said two members, operating the driving member at a constant speed and varying the speed of the driven member by changing the number of effective conductors on the armature and altering the strength of the field of said electric machine, substantially as described.

5. The method of transmitting power from a driving to a driven member, the same consisting in starting and operating at a constant speed one member of an electric machine rotatably connected to said driving member and independent of the load to be driven, starting the said load by closing the circuit of the electric machine interposed between it and the driving member independently of the external sources of current, and varying the speed of the load by changing the electric characteristics of said interposed machine, substantially as described.

In testimony whereof I have signed my name to this specification in the presence of two subscribing witnesses.

ARTHUR C. EASTWOOD.

Witnesses:
 LA ROY RAUDENBUSH,
 JOS. H. KLEIN.